United States Patent
Pairolero et al.

(10) Patent No.: US 10,138,794 B2
(45) Date of Patent: Nov. 27, 2018

(54) METHODS OF CLEANING GAS SENSORS

(71) Applicant: GM GLOBAL TECHNOLOGY OPERATIONS LLC, Detroit, MI (US)

(72) Inventors: Luca Giuseppe Pairolero, Rivoli (IT); Carlo Daniele Ceriani, Turin (IT); Riccardo Graglia, Graglia (IT)

(*) Notice: Subject to any disclaimer, the term of this patent is extended or adjusted under 35 U.S.C. 154(b) by 103 days.

(21) Appl. No.: 15/278,422

(22) Filed: Sep. 28, 2016

(65) Prior Publication Data
US 2018/0087433 A1 Mar. 29, 2018

(51) Int. Cl.
| | | |
|---|---|---|
| F01N 11/00 | (2006.01) | |
| F02B 3/06 | (2006.01) | |
| F02D 35/02 | (2006.01) | |
| F01N 13/00 | (2010.01) | |
| F02D 41/40 | (2006.01) | |
| F01N 9/00 | (2006.01) | |

(52) U.S. Cl.
CPC .......... *F01N 13/008* (2013.01); *F01N 9/00* (2013.01); *F01N 11/00* (2013.01); *F01N 11/007* (2013.01); *F02B 3/06* (2013.01); *F02D 35/021* (2013.01); *F02D 41/401* (2013.01); *F01N 2560/02* (2013.01); *F01N 2560/025* (2013.01); *F01N 2560/026* (2013.01); *F01N 2560/20* (2013.01)

(58) Field of Classification Search
CPC ........ F02D 35/021; F02D 41/401; F02B 3/06; F01B 9/047; F01N 11/00; F01N 11/007
USPC .......................................... 60/274, 277, 295
See application file for complete search history.

(56) References Cited

U.S. PATENT DOCUMENTS

| | | | | |
|---|---|---|---|---|
| 6,082,175 | A * | 7/2000 | Yoshikawa | G01N 27/407 204/426 |
| 2006/0037394 | A1* | 2/2006 | Shiffer | G01D 11/245 73/431 |
| 2013/0022505 | A1* | 1/2013 | Tsujimoto | F01N 3/2033 422/109 |
| 2013/0236364 | A1* | 9/2013 | Tsujimoto | F01N 3/103 422/109 |

* cited by examiner

*Primary Examiner* — Mark Laurenzi
*Assistant Examiner* — Dapinder Singh

(57) ABSTRACT

Methods for cleaning gas sensors used in an exhaust gas system are provided. The exhaust gas system can include an exhaust gas stream supplied by an exhaust gas source through an exhaust gas conduit, and a gas sensor having a sampling end disposed within the exhaust gas conduit. The methods can include positioning at least one glow plug proximate the gas sensor; and activating the at least one glow plug such that exhaust gas deposits accumulated on the gas sensor sampling end are removed. The methods can optionally further comprise one or more of determining a glow plug activation interval and determining a glow plug activation duration. Systems for performing the disclosed methods are also provided.

20 Claims, 2 Drawing Sheets

METHODS OF CLEANING GAS SENSORS

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons, oxides of nitrogen ($NO_x$), and oxides of sulfur ($SO_x$), as well as condensed phase materials (liquids and solids) that constitute particulate matter. Liquids can include water and hydrocarbons, for example.

Exhaust gas treatment systems may employ filter and catalyst devices configured for accomplishing an aftertreatment process such as reducing $NO_x$ to produce more tolerable exhaust constituents of nitrogen ($N_2$) and water ($H_2O$), or trapping particulate matter. Exhaust gas treatment systems also employ sensors in order to monitor the gaseous concentrations within the exhaust gas stream and the performance of catalytic components and exhaust filters. Gas sensors include a sampling end located within the exhaust system comprising sampling orifices through which a gas sample can be collected. Due to the presence of soot and particulate matter within the exhaust gas, these sampling holes and/or gas paths within the sensor can become clogged and prevent accurate monitoring of the exhaust gas and treatment system devices.

SUMMARY

According to an aspect of an exemplary embodiment, a method for cleaning gas sensors used in an exhaust gas system is provided. The exhaust gas system can include an exhaust gas stream supplied by an exhaust gas source through an exhaust gas conduit, and a gas sensor having a sampling end disposed within the exhaust gas conduit. The methods can include positioning at least one glow plug proximate the gas sensor; and activating the at least one glow plug such that exhaust gas deposits accumulated on the gas sensor sampling end are removed. Removal of exhaust gas deposits can be through an exothermic event. The methods can optionally further comprise one or more of determining a glow plug activation interval and determining a glow plug activation duration. Systems for performing the disclosed methods are also provided.

Although many of the embodiments herein are described in relation to exhaust gas systems, the embodiments herein are generally suitable for cleaning gas sensors in various unrelated applications.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to methods for cleaning gas sensors, such as $O_2$ and $NO_x$ sensors. In particular, this disclosure pertains to cleaning the sampling orifices and proximate regions of gas sensors to remove exhaust gas deposits. Exhaust gas streams are generated, in some embodiments, by internal combustion engines (ICE) which can, for example, power a vehicle. Exhaust gas deposits can include particulate matter, carbonaceous soot, $NO_x$, species, exhaust gas liquids, and other species germane to exhaust gas. As used herein, "$NO_x$" refers to one or more nitrogen oxides. $NO_x$ species can include $N_yO_x$ species, wherein y>0 and x>0. Non-limiting examples of nitrogen oxides can include $NO$, $NO_2$, $N_2O$, $N_2O_2$, $N_2O_3$, $N_2O_4$, and $N_2O_5$.

Figure 1:
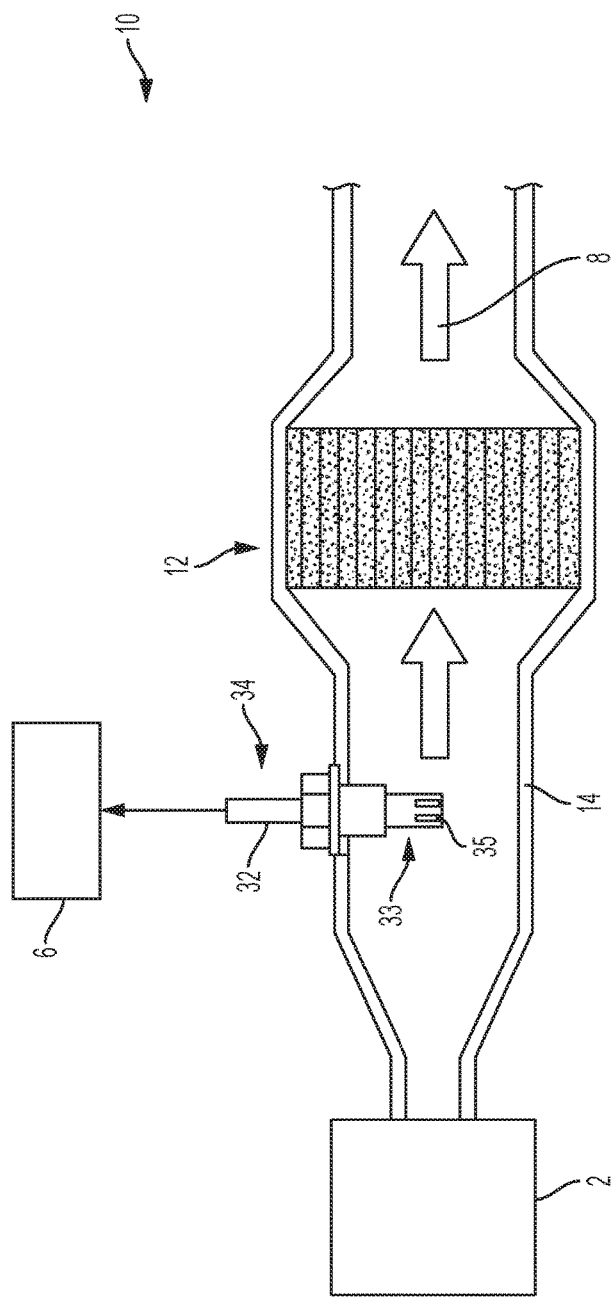
FIG. 1 illustrates an exhaust gas treatment system, according to one or more embodiments.

Gas sensors are commonly utilized in exhaust gas treatment systems. FIG. 1 illustrates an exhaust gas treatment system 10 for treating and/or monitoring the exhaust gas 8 constituents of an ICE 2. The exhaust gas treatment system 10 described herein can be implemented in various ICE systems that can include, but are not limited to, diesel engine systems, gasoline direct injection systems, and homogeneous charge compression ignition engine systems. The ICEs will be described herein for use in generating torque for vehicles, yet other non-vehicular applications are within the scope of this disclosure. Therefore when reference is made to a vehicle, such disclosure should be interpreted as applicable to any application of an ICE. Moreover, ICE 2 can generally represent any device capable of generating an exhaust gas 8 comprising gaseous, carbonaceous, and/or particulate matter species, and the disclosure herein should accordingly be interpreted as applicable to all such devices. It should be further understood that the embodiments disclosed herein may be applicable to treatment of effluent streams not comprising carbonaceous and/or particulate matter species, and, in such instances, ICE 2 can also generally represent any device capable of generating an effluent stream comprising such species. For Example, ICE 2 can include a plurality of reciprocating pistons (not shown) attached to a crankshaft (not shown), which may be operably attached to a driveline, such as a vehicle driveline (not shown), to deliver tractive torque to the driveline. For example, ICE 2 can be any engine configuration or application, including various vehicular applications (e.g., automotive, marine and the like), as well as various non-vehicular applications (e.g., pumps, generators and the like).

The exhaust gas treatment system 10 generally includes one or more exhaust gas conduits 14, and one or more exhaust treatment devices, such as oxidation catalyst (OC) device 12 in fluid communication with ICE 2. OC device 12 is provided merely for the sake of example, and other exhaust treatment devices, such as selective catalytic reduction devices, particulate filters, and selective catalytic reduction filter devices, can be additionally or alternatively utilized. The exhaust gas conduit 14, which can comprise several segments, transports exhaust gas 8 from the ICE 2 to the various exhaust treatment devices of the exhaust gas treatment system 10.

The exhaust gas treatment system 10 includes at least one gas sensor, such as gas sensor 32. Gas sensor 32 can be utilized to monitor the gaseous composition of the exhaust gas 8 and/or monitor the performance of various exhaust treatment devices. Gas sensor 32 includes a sampling end 33 located within the exhaust gas conduit 8 such that it is capable of contacting exhaust gas 8. Gas sensor 32 can optionally include a second end 34 located outside of the exhaust gas conduit 14. Sampling end 33 includes one or more sampling orifices 35 through which a gas sample can be collected and/or analyzed by internal sensing elements. Gas sensor 32 can be operatively connected to electronic engine control module (ECM) 6 that can be configured to accomplish control within exhaust gas 8 in accordance with control methods and strategies described herein, among others. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

During operation of exhaust gas treatment system 10, exhaust gas 8 species can deposit on gas sensor 32 sampling end 33 and occlude or partially occlude the one or more sampling orifices 35. Accordingly, accurate sampling of exhaust gas 8 and/or gas sensor 32 response time is retarded or prevented.

Figure 2:
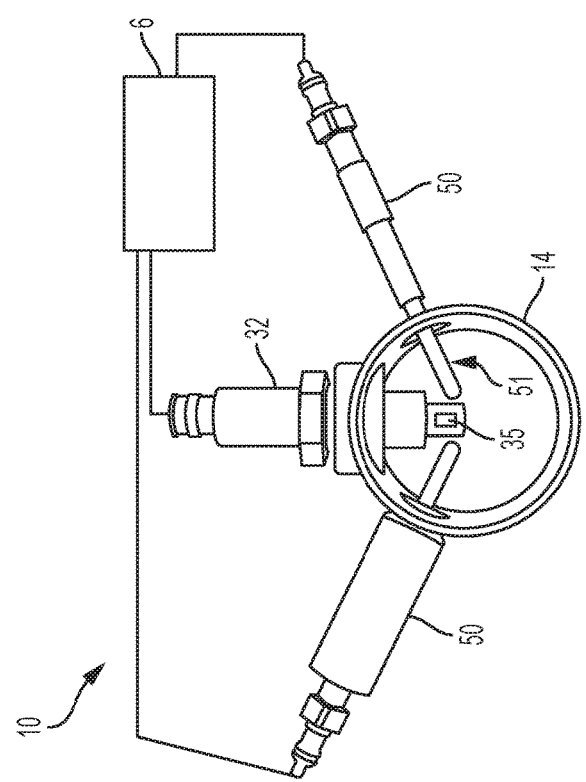
FIG. 2 illustrates an exhaust gas treatment system, according to one or more embodiments.

Provided herein are systems and methods for cleaning gas sensors, such as gas sensor 32, during engine operation or after-run which obviate the need for overhauling the engine. FIG. 2 illustrates an exhaust gas system 10 that includes exhaust gas conduit 14, gas sensor 32 operably connected to ECM 6, and one or more glow plugs 50. Glow plugs 50 are heating devices that general comprise an elongated tip 51 that includes a heating element. The heating element can generate heat through electrical resistance when electrified, for example. Glow plugs 50 can reach temperatures in excess of 1,000° C. in less than a few seconds. The heat exchanged to bodies proximate glow plugs 50 can follow a nonlinear function saturating to a target temperature. Applying heat to exhaust gas deposits can cause the deposits to one or more of burn, and dislodge from a substrate, such as gas sensor 32 sampling end 33. For example, heating carbonaceous exhaust gas deposits to temperatures at or about 650° C. can initiate soot burning. Soot burning can convert carbonaceous solids to gases such as carbon dioxide, for example. Glow plugs 50 can be operably connected to ECM 6.

One or more glow plugs 50 can be positioned proximate the sampling end 33 of gas sensor 32 such that heat emitted from glow plus 50 can interact with gas sensor 32 and any deposits on sampling end 33. A proximate position can comprise a non-contiguous position. A non-contiguous proximate position can be defined by the distance between the gas sensor 32 sensing end 33 and the glow plug 50 tip 51. A proximate position can comprise a contiguous position which does not occlude one or more sampling orifices. In some instances, more deposits will accumulate on the upstream side of gas sensor 32 sampling end 33. Accordingly, in some embodiments, One or more glow plugs 50 can be positioned upstream of gas sensor 32.

Figure 3:
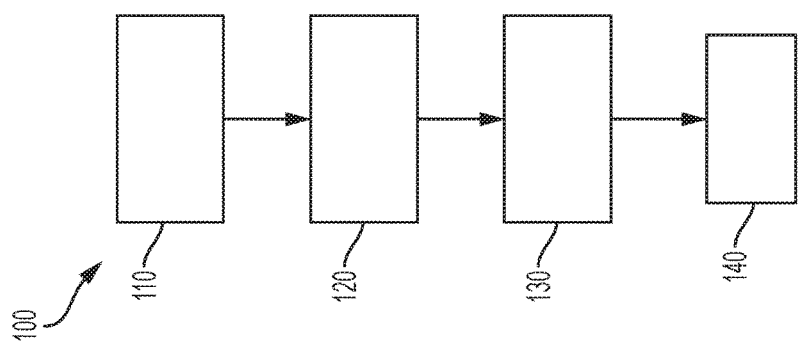
FIG. 3 illustrates a block diagram of a method for cleaning a gas sensor, according to one or more embodiments.

FIG. 3 illustrates a method 100 for cleaning a gas sensor, comprising positioning 110 at least one glow plug proximate a gas sensor, and activating 140 the at least one glow plug such that exhaust gas deposits accumulated on the gas sensor sampling end are removed. Method 100 can be utilized for exhaust gas systems such as system 10. Method 100 can optionally further comprise determining 120 a glow plug activation interval (i.e., frequency), and/or determining 130 a glow plug activation duration. Determining 130 the glow plug activation duration can be done experimentally. For example, a glow plug can be activated 140 for a fixed time such as 180 second. Determining 120 the glow plug activation interval and determining 130 the glow plug activation duration can optionally rely on one or more of the temperature of the glow plug, the proximity of the glow plug to the gas sensor, and operational characteristics of the gas sensor. Determining 120 the glow plug activation interval and determining 130 the glow plug activation duration can optionally also rely on a sensor response time, such as a response time of sensor 34. A longer response time of a sensor can indicate a higher degree of exhaust gas deposits. Determining 120 the glow plug activation interval and determining 130 the glow plug activation duration can optionally rely on the overall mileage of a vehicle when method 100 is utilized for an exhaust gas system such as system 10. For example, a particularly mileage threshold of 1,000 km relative to the last activation 140 can be used. Determining 120 the glow plug activation interval and determining 130 the glow plug activation duration can optionally rely on an operating time of an ICE 2 when method 100 is utilized for an exhaust gas system such as system 10. For example, a particularly operating time threshold of 12 hours relative to the last activation 140 can be used. Determining 120 the glow plug activation interval and determining 130 the glow plug activation duration can rely on one or more of all of the above factors.

In a particular example, determining 120 the glow plug activation interval can comprise an open-loop model based on developmental results from engines running in a validation test fleet, for example. In such an open-loop model, activation 140 can be performed at least as often as dictated by the developmental results. The open-loop model interval can optionally be increased by a safety factor, such as a 10% reduction in the interval. In another particular example, determining 120 the glow plug activation interval can comprise a closed-loop model based on a sensor response time during ICE operation. A prescribed maximum response time threshold can trigger activation 140.

Positioning 110 the at least one glow plug proximate a gas sensor can include positioning a glow plug in a contiguous position. Positioning 110 the at least one glow plug proximate a gas sensor can include positioning a glow plug in a contiguous position. Positioning 110 the at least one glow plug proximate a gas sensor can include positioning at least one glow plug in a non-contiguous position and positioning at least one glow plug in a contiguous position.

The distance between a glow plug in a non-contiguous proximate position and the gas sensor can be determined by the operating temperature of the glow plug (e.g., 1,000° C.) and the temperature required to burn deposits or otherwise cause deposits to react and dislodge from the gas sensor. The latter temperature can be determined based upon the source of the exhaust gas stream (e.g., an ICE), for example. The heat imparted to a gas sensor via a glow plug decreases with increased proximity, which can be quantified by a theoretical or empirical curve. For example, in a contiguous position, a glow plug can heat a gas sensor to 1,000° C., and in a non-contiguous position with a separation of about 5 mm a glow plug can heat a gas sensor to about 300° C.

When method 100 is utilized for exhaust gas systems such as system 10, activating 140 the at least one glow plug can occur while the ICE 2 is running. Additionally or alternatively, when method 100 is utilized for exhaust gas systems such as system 10, activating 140 the at least one glow plug can occur while the ICE 2 is not running. In such an instance where the ICE 2 has previously been running, this time period can be called "after-run". It can be particularly advantageous to active 140 the at least one glow plug during after-run because glow plug activation temperatures often greatly exceed exhaust gas temperatures, and therefore exhaust gas can impede the cleaning method 100 by cooling the glow plugs. The at least one glow plug can be activated via an ECM during after-run, for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for cleaning a gas sensor used in an exhaust gas system including an exhaust gas stream supplied by an exhaust gas source through an exhaust gas conduit, and a gas sensor having a sampling end disposed within the exhaust gas conduit, the method comprising:
   positioning at least one glow plug proximate the gas sensor; and
   activating the at least one glow plug such that exhaust gas deposits accumulated on the gas sensor sampling end are removed.

2. The method of claim 1, further comprising determining a glow plug activation interval.

3. The method of claim 1, wherein the exhaust gas deposits comprise carbonaceous solids.

4. The method of claim 1, wherein one of the at least one glow plugs is contiguous with the gas sensor sampling end.

5. The method of claim 4, wherein the gas sensor sampling end comprises one or more sampling orifices, and the contiguous glow plug does not occlude any of the one or more sampling orifices.

6. The method of claim 1, wherein one of the at least one glow plugs is non-contiguous with the gas sensor sampling end.

7. The method of claim 1, wherein one of the wherein one of the at least one glow plugs is contiguous with the gas sensor sampling end, and another glow plug of the at least one glow plugs is non-contiguous with the gas sensor sampling end.

8. The method of claim 1, wherein the gas sensor comprises an oxygen or $NO_x$ sensor.

9. The method of claim 1, wherein the gas sensor and the one or more glow plugs are operably connected to an electronic control unit.

10. The method of claim 1, wherein activating the at least one glow plug comprises heating the sampling end of the gas sensor to at least 650° C.

11. An apparatus for cleaning a gas sensor used in an exhaust gas system, the apparatus including:
    an exhaust gas stream supplied by an exhaust gas source through an exhaust gas conduit;
    a gas sensor having a sampling end disposed within the exhaust gas conduit; and
    at least one glow plug positioned proximate the gas sensor;
    wherein activating the at least one glow plug removes exhaust gas deposits accumulated on the gas sensor sampling end.

12. The apparatus of claim 11, wherein the glow plug is activated at an interval.

13. The apparatus of claim 11, wherein wherein the exhaust gas deposits comprise carbonaceous solids.

14. The apparatus of claim 11, wherein one of the at least one glow plugs is contiguous with the gas sensor sampling end.

15. The apparatus of claim 14, wherein the gas sensor sampling end comprises one or more sampling orifices, and the contiguous glow plug does not occlude any of the one or more sampling orifices.

16. The apparatus of claim 11, wherein one of the at least one glow plugs is non-contiguous with the gas sensor sampling end.

17. The apparatus of claim 11, wherein one of the wherein one of the at least one glow plugs is contiguous with the gas sensor sampling end, and another glow plug of the at least one glow plugs is non-contiguous with the gas sensor sampling end.

18. The apparatus of claim 11, wherein the gas sensor comprises an oxygen or $NO_x$ sensor.

19. The apparatus of claim 11, wherein the gas sensor and the one or more glow plugs are operably connected to an electronic control unit.

20. The apparatus of claim 11, wherein activating the at least one glow plug comprises heating the sampling end of the gas sensor to at least 650° C.

* * * * *